Figure 5:
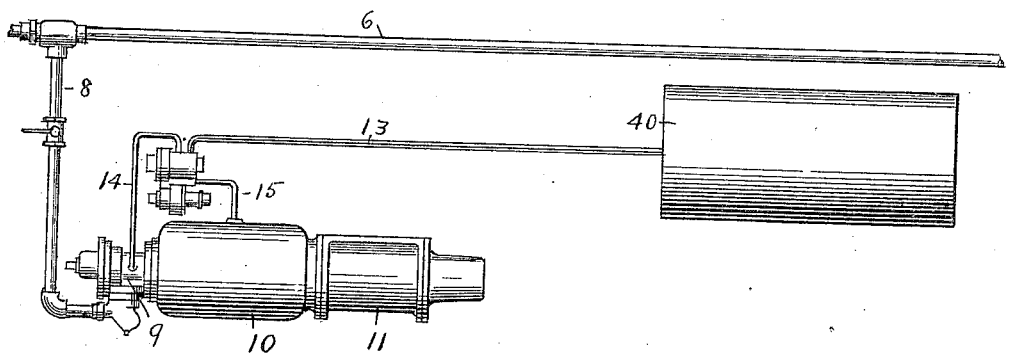

W. V. TURNER.
AIR BRAKE PROTECTION VALVE.
APPLICATION FILED MAR. 7, 1905.
971,326.
Patented Sept. 27, 1910.
2 SHEETS—SHEET 1.
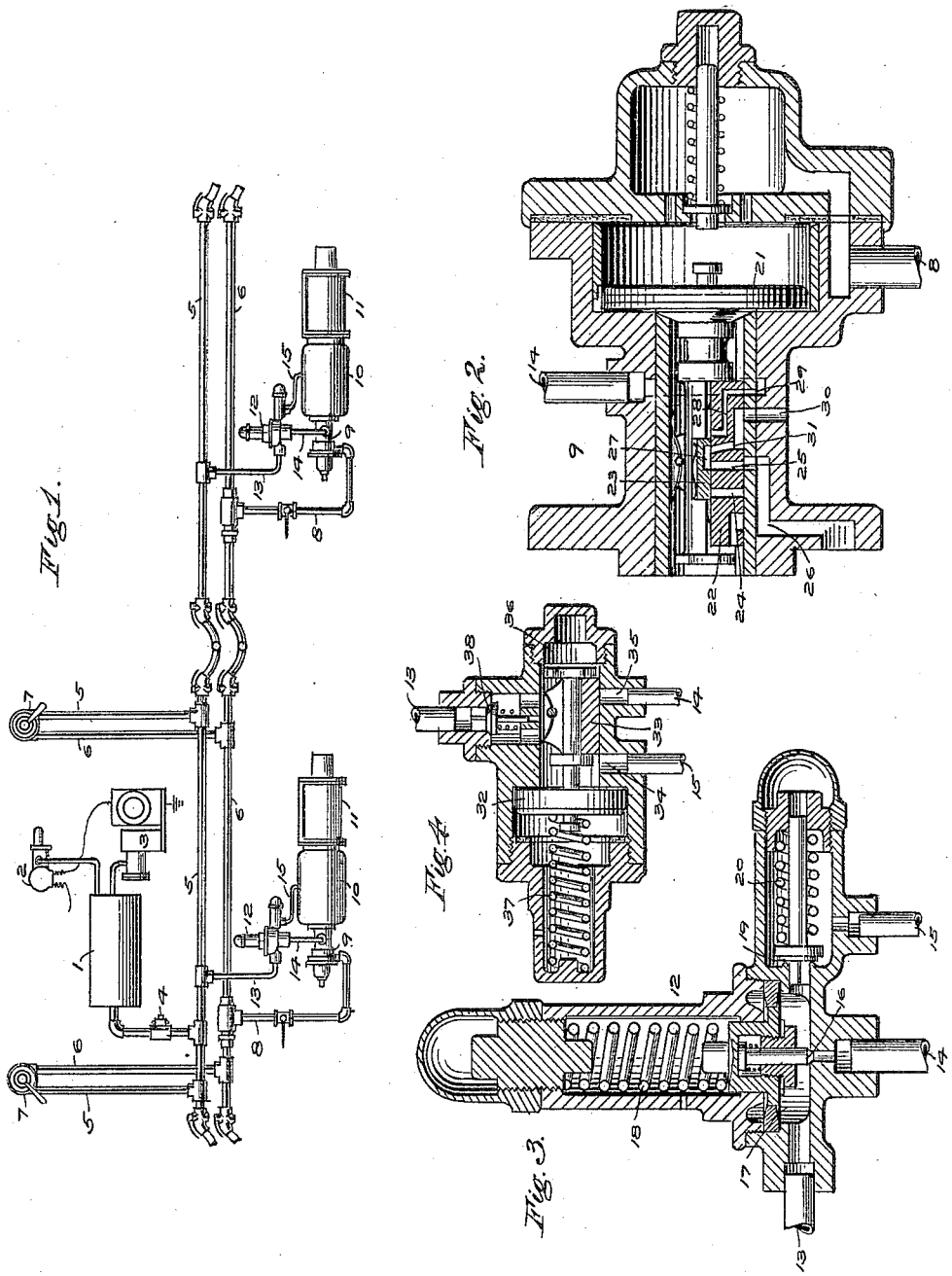
WITNESSES
Francis L. Clark
J. B. MacDonald
INVENTOR
Walter V. Turner
by E. A. Wright
Att'y.

W. V. TURNER.
AIR BRAKE PROTECTION VALVE.
APPLICATION FILED MAR. 7, 1905.

971,326.

Patented Sept. 27, 1910.
2 SHEETS—SHEET 2.

WITNESSES
Francis L. Clark
J. B. MacDonald

INVENTOR
Walter V. Turner
by E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

AIR-BRAKE PROTECTION-VALVE.

971,326.      Specification of Letters Patent.     Patented Sept. 27, 1910.

Application filed March 7, 1905. Serial No. 243,882.

*To all whom it may concern:*

Be it known that I, WALTER V. TURNER, a citizen of the United States, residing at Wilkinsburg, in the county of Allegheny and State of Pennsylvania, have invented a certain new and useful Improvement in Air-Brake Protection-Valves, of which the following is a specification.

This invention relates to automatic air brake systems, and more particularly to that form of apparatus in which the triple valve is provided with an additional port and pipe connection for supplying air from the main reservoir, control pipe line, supplemental reservoir, or other source, to the auxiliary reservoir for the purpose of securing a quick recharge and also a graduated release of the brakes when desired, as disclosed, for instance, in Reissue Patent No. 12,047, of Oct. 28, 1902, and prior pending application, Ser. No. 233,410, filed Nov. 19, 1904.

This construction is particularly adapted for use in electric traction service, in which the motorman's brake valves have removable handles for leaving the valves locked in lap position when not in use, as when the train is standing in the barn or yard and the brake system is empty.

It is the custom, before starting a train out, to connect up the electric current to the motor driven air compressor for charging up the main reservoirs, and as this is often done before the motorman arrives to set the brake valve in running position, it sometimes happens that air under pressure is supplied through the additional connection to the triple valve before any pressure has accumulated in the train pipe and auxiliary reservoir, so that if the slide valve is not in release position it may be raised from its seat by this pressure, thereby permitting the access of dirt, scale or other foreign matter to the valve seat, which is very detrimental to the action of the device.

This invention is also applicable to that form of air brake apparatus in which a supplemental reservoir is connected to this additional port in the triple valve, since when a car is cut out and left on a siding the air pressure gradually leaks away and the first effect of this is to move the triple valve to application position, thereby covering the additional port leading to the supplemental reservoir. Then as the compressed air first leaks away from the brake cylinder, train pipe, and auxiliary reservoir, the pressure remaining in the supplemental reservoir will lift the slide valve of the triple from its seat, thus rendering the device subject to the objections above noted.

The principal object of my present invention, therefore, is to provide means for preventing the flow of air to the additional triple valve port when there is insufficient pressure in the auxiliary reservoir or valve chamber to hold the slide valve to its seat.

Another object is to provide means for supplying air from the main reservoir, control pipe line, supplemental reservoir, or other source, to the auxiliary reservoir when the pressure therein is depleted below a predetermined amount.

In the accompanying drawings, Figure 1 is a diagram showing an air brake equipment embodying my improvement and applied to a train of two cars; Fig. 2 a sectional view of the triple valve device; Fig. 3 a sectional view of one form of my improved protection valve device; Fig. 4 a sectional view showing a modification; Fig. 5 a diagram illustrating another form of my improvement as applied to a single car equipment having a supplemental reservoir; and Fig. 6 a sectional view of the form of protection valve device indicated in Fig. 5.

According to the construction shown in Sheet 1 of the drawings, the equipment comprises a main reservoir 1, motor driven pump 3, electric pump governor 2, main reservoir pipe or, as it is called, control pipe 5, communicating through reducing valve or feed valve 4 with the main reservoir, train pipe 6, motorman's brake valve 7, branch pipe 8, triple valve device 9, auxiliary reservoir 10, and brake cylinder 11.

Fig. 1 shows one car equipped as a motor car, and the other as a trailer, but it is understood that a train may be composed of any desired number of motor cars or trailers.

The triple valve device comprises the usual casing, having a piston chamber communicating with the branch pipe 8, piston 21, main slide valve 22, graduating slide valve 23, service port 24, brake cylinder port 26, and exhaust port 30. In the slide valve seat is located an additional port 29, communicating with pipe 14, through which air may be supplied from the main reservoir, control pipe or other source, and the main slide valve is provided with ports 25, 31 and 28, while the small graduating valve 23 has a cavity 27 and is adapted to control these ports in the main slide valve. When the brakes are applied, the port 29 is closed, but as the valve moves to release position the port 29 registers with port 28, which is uncovered by the small slide valve 23 thereby permitting air to flow from pipe 14 into the valve chamber and assist in rapidly restoring the pressure in the auxiliary reservoir. If, after the brake is applied, it is desired to grade down the brake cylinder pressure, the train pipe pressure is increased only a slight degree sufficient to move the triple valve to release position, whereupon a portion of the air escapes from the brake cylinder through ports 26, 25, 27, 31 and 30, but the air under pressure from pipe 14 flowing into the valve chamber through ports 29 and 28 raises the pressure on the auxiliary reservoir side of the piston above that of the train pipe and immediately moves out the graduating slide valve to close the outlet from the brake cylinder and the inlet through port 28. In this manner, by successively increasing the train pipe pressure, a graduated release of the brakes may be secured.

As thus far described, the construction does not differ materially from that covered by the prior pending application, Ser. No. 233410, above cited. If air under pressure should be supplied to port 29 when the brake valve is on lap and the train pipe and auxiliary reservoir have only atmospheric pressure, it will be apparent that the piston would be moved out and the slide valve blown from its seat, and in order to prevent such an occurrence I provide what may be termed a protection valve device 12, having pipe connections 13 with the main reservoir or control line, 14 with the triple valve, and 15 with the auxiliary reservoir. This device, as shown in Fig. 3, comprises a valve 16 operated by a diaphragm or piston 17 and an adjustable spring 18 for controlling the supply of air through the pipe 14, and an excess pressure valve 19 having a spring 20 for governing the supply from the control line through pipe 15 to the auxiliary reservoir. If the control pipe is normally charged to a pressure of 70 pounds per square inch the spring 18 may be adjusted to hold the valve 16 closed when the pressure acting on the diaphragm 17 is below 40 or 50 pounds, and the spring 20 may be set to about 20 pounds. If then, the pump should be started to charge the main reservoir and control pipe line when the brake valve is in lap position, and with the train pipe and auxiliary reservoir exhausted of air under pressure, the valve 16 will not open to permit the flow of air to the triple valve until the control line pressure has risen to 40 or 50 pounds, sufficient to overcome the spring 18, but in the meantime the auxiliary reservoir has been charged through the excess pressure valve 19 to about 30 pounds, which is ample to hold the slide valves properly seated. If there is no compressed air in the train pipe this auxiliary reservoir pressure will of course move the triple valve piston out against its gasket and charge the brake cylinder to the same degree of pressure, and this is a feature tending to give greater safety since it necessitates the release and proper test of the brakes, and guards against the accident of leaving the cut out cock in branch pipe 8 closed before taking a train out into service. Another advantage derived from this form of my improved valve mechanism is that in case the auxiliary reservoir pressure should for any reason become depleted below 50 pounds during the operation of braking, the valve 19 will operate to supply air from the control line to the auxiliary reservoir and maintain the pressure therein.

According to the modification shown in Fig. 4, the protection valve comprises a casing containing a chamber 36, having slide valve 33 and piston 32 with spring 37, the slide valve controlling ports 34 and 35 communicating with pipes 15 and 14 respectively. When the pressure in the control line admitted through pipe 13 is less than that of the spring, say 50 pounds, the valve covers port 35 while port 34 is open to freely supply the auxiliary reservoir through pipe 15. When the pressure rises high enough to compress the spring and move the piston 32 over to its seat against the gasket the port 34 is closed while port 35 is opened, thereby establishing free communication from the control line to the triple valve through pipe 14. A check valve 38 may be used to prevent the escape of air from the auxiliary reservoir to the atmosphere in case of a bursted hose in the control pipe line.

Figure 6:
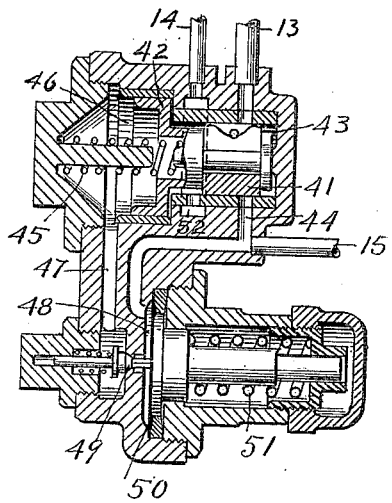

In Figs. 5 and 6 I have illustrated another form of valve device embodying my invention and applied to a single car equipment having a supplemental reservoir 40, which may be charged from the train pipe 6 or auxiliary reservoir 10, for supplying air to the pipe 14 and triple valve port upon release of the brakes. As shown in Fig. 6 this form of protection valve comprises a casing having a valve chamber 43 and piston chamber 46 containing slide valve 41 and piston 42, the valve chamber communicating through pipe 13 with the supplemental reservoir 40. In the slide valve seat are located the port 52 communicating with pipe 14 leading to the additional port of the triple valve, and the port 44 leading to the diaphragm chamber 48 and also communicating by pipe 15 with the auxiliary reservoir 10. The diaphragm 50 is therefore subject on one side to the pressure of the auxiliary reservoir, and on the opposite side to the adjustable spring 51, and operates the small regulating valve 49 to control the flow of air from the chamber 46 in the rear of the piston through passage 47 to the diaphragm chamber and the auxiliary reservoir. The spring 45 normally holds the slide valve 41 in the position shown with the port 44 closed and the port 52 open when the air pressure is balanced on opposite sides of the piston 42, and the spring 51 is usually adjusted to an auxiliary reservoir pressure of about 50 pounds per square inch.

When the system is being charged, air under pressure flows through the train pipe and feed groove of the triple valve in the usual manner to the auxiliary reservoir, and also through pipe 14, port 52, chamber 43 and pipe 13 to the supplemental reservoir 40, raising the pressure therein to the normal standard degree. There is no action of the protection valve during the charging operation, as the pressure remains substantially equal upon opposite sides of the piston, and the valve also remains in this position during the usual operations of applying and releasing the brakes. If, however, at the time of applying the brakes, the pressure in the auxiliary reservoir should be depleted below that for which the spring 51 is adjusted the small regulating valve 49 would be raised from its seat thereby opening communication from chamber 46 to the auxiliary reservoir, whereupon the higher pressure of the supplemental reservoir in the chamber 43 acts upon the piston to move the slide valve to uncover the port 44 and supply air to the auxiliary reservoir through pipe 15. As the pressure in the auxiliary reservoir rises to 50 pounds the spring 51 is compressed sufficiently to permit the small valve 49 to close, whereupon the pressure immediately equalizes around the piston 42 and the spring 45 moves the slide valve to close the port 44. In this way the auxiliary reservoir pressure is maintained at the degree to which the spring 51 is adjusted by drawing from the supplemental reservoir or other source of air under pressure. In case the car is set out from the train, and the air pressure in the brake system permitted to leak away, the triple valve usually moves over to application position, since the train pipe pressure diminishes by leakage more rapidly than the auxiliary reservoir. In this position the slide valve of the triple covers the port communicating with the pipe 14 and the supplemental reservoir, thereby holding the higher pressure sealed up in the supplemental reservoir while the air under pressure in the train pipe, auxiliary reservoir and brake cylinder is rapidly leaking away. As soon as the auxiliary reservoir pressure has reduced to 50 pounds, the adjustment of spring 51, the regulating valve is opened, thereby establishing communication from the supplemental reservoir to the auxiliary reservoir through the valve chamber, around the piston 42, passage 47, chamber 48, and pipe 15. If the leakage from the auxiliary reservoir is more rapid than the flow of air around the piston 42 the slide valve is moved by the piston to open the port 44, so that the pressure in the supplemental reservoir will in any event then reduce at the same rate as the auxiliary reservoir, and will not raise the slide valve of the triple valve off from its seat, thereby preventing the possibility of dirt, scale or other injurious foreign matter from accumulating upon the slide valve seat.

The form of valve device shown in Fig. 6 is the preferred construction, and may be applied equally well to air brake apparatus indicated in Fig. 1, in which case the admission of air from the main reservoir or control pipe line through pipe 13, when the auxiliary reservoir was depleted, would act upon the piston to move the slide valve to close port 52 and open port 44, thereby supplying air through pipe 15 directly to the auxiliary reservoir until the pressure therein reached the degree for which the spring 51 was adjusted. The pressure would then equalize around piston 42 and the spring 45 would act to return the slide valve to open port 52 and close port 44.

While I have shown three different forms of valve devices embodying my improvements, it will be apparent that this invention is not limited to any particular construction but covers broadly any valve mechanism for preventing the flow of air from a source of high pressure to the additional graduated release port of the triple valve at such times as the auxiliary reservoir is depleted of air pressure and the slide valve is liable to be raised from its seat.

Having now described my invention, what I claim as new and desire to secure by Letters Patent is:—

1. In an air brake, the combination with a train pipe, auxiliary reservoir, and brake cylinder, of an additional reservoir or source of pressure, a triple valve having a port for supplying air from the additional source to the auxiliary reservoir, and automatic means for preventing the supply of air under a high pressure from the additional source to the triple valve when the auxiliary reservoir is depleted.

2. In an air brake, the combination with a train pipe, auxiliary reservoir, and brake cylinder, of an additional reservoir or source of pressure, a triple valve having a port for supplying air from the additional source to the auxiliary reservoir, and a valve device for controlling the supply of air from the additional source to the said triple valve port.

3. In an air brake, the combination with a train pipe, auxiliary reservoir, and brake cylinder, of an additional reservoir or source of pressure, a triple valve having a port for supplying air from the additional source to the auxiliary reservoir, and a valve device operated by pressure from the additional source for controlling communication to said triple valve port.

4. In an air brake, the combination with a train pipe, auxiliary reservoir, brake cylinder, and a triple valve having an additional port for supplying air to the auxiliary reservoir, of a pipe or passage leading from an additional source of pressure to said port, means for supplying air to the auxiliary reservoir through a separate connection, and a valve device for controlling communication through the pipe leading to the said triple valve port.

5. In an air brake, the combination with a train pipe, auxiliary reservoir, brake cylinder, and a triple valve having an additional port for supplying air to the auxiliary reservoir, of a pipe or passage leading from an additional source of pressure to said port, a separate pipe or passage communicating with the auxiliary reservoir, and a valve device for controlling the supply of air from the additional source through said passages.

6. In an air brake, the combination with a train pipe, auxiliary reservoir, and brake cylinder, of an additional reservoir or source of pressure, a triple valve having a port for supplying air from the additional source to the auxiliary reservoir, and a fluid pressure actuated valve device for controlling communication from the additional source to the said triple valve port and to the auxiliary reservoir.

7. In an air brake, the combination with a train pipe, auxiliary reservoir, and brake cylinder, of an additional reservoir or source of pressure, a triple valve having a port for supplying air from the additional source to the auxiliary reservoir, and a valve device comprising a main valve for controlling communication to the said triple valve port, a piston for operating said main valve, and a regulating valve for governing the pressure upon said piston.

8. In an air brake, the combination with a train pipe, auxiliary reservoir, and brake cylinder, of an additional reservoir or source of pressure, a triple valve having a port for supplying air from the additional source to the auxiliary reservoir, and a valve device comprising a main valve for controlling communication to the said triple valve port and to the auxiliary reservoir, a piston for operating said main valve, and a regulating valve governed by the auxiliary reservoir pressure for varying the pressure on one side of said piston.

9. In an air brake, the combination with a train pipe, auxiliary reservoir, and brake cylinder, of an additional reservoir or source of pressure, and a valve device comprising a main valve for controlling communication from the additional source to the auxiliary reservoir, and a regulating valve and diaphragm constantly subject to the auxiliary reservoir pressure for controlling the pressure on one side of said piston.

10. In an air brake, the combination with a main reservoir, control pipe, train pipe, auxiliary reservoir, triple valve, and brake cylinder, of a valve device governed by and constantly subject to the auxiliary reservoir pressure for supplying air from the control pipe to the auxiliary reservoir.

In testimony whereof I have hereunto set my hand.

WALTER V. TURNER.

Witnesses:
R. F. EMERY,
J. B. MACDONALD.